United States Patent
Montagne et al.

(10) Patent No.: US 9,160,010 B2
(45) Date of Patent: Oct. 13, 2015

(54) SELF-HEALING VITREOUS COMPOSITION, METHOD FOR PREPARING SAME, AND USES THEREOF

(75) Inventors: Lionel Montagne, Laventie (FR); Daniel Coillot, Oignies (FR); Francois Mear, Lambersart (FR)

(73) Assignee: Centre National de la Recherche Scientifique, Paris (FR)

( * ) Notice: Subject to any disclaimer, the term of this patent is extended or adjusted under 35 U.S.C. 154(b) by 989 days.

(21) Appl. No.: 13/322,196

(22) PCT Filed: May 27, 2010

(86) PCT No.: PCT/FR2010/051012
§ 371 (c)(1),
(2), (4) Date: Jan. 30, 2012

(87) PCT Pub. No.: WO2010/136721
PCT Pub. Date: Dec. 2, 2010

(65) Prior Publication Data
US 2012/0181725 A1  Jul. 19, 2012

(30) Foreign Application Priority Data

May 27, 2009 (FR) ..................................... 09 53490

(51) Int. Cl.
| | | |
|---|---|---|
| *C03C 8/24* | (2006.01) | |
| *H01M 8/02* | (2006.01) | |
| *C03C 3/087* | (2006.01) | |
| *C03C 8/14* | (2006.01) | |
| *C03C 14/00* | (2006.01) | |

(52) U.S. Cl.
CPC .............. *H01M 8/0282* (2013.01); *C03C 3/087* (2013.01); *C03C 8/14* (2013.01); *C03C 8/24* (2013.01); *C03C 14/004* (2013.01); *C03C 2214/04* (2013.01); *Y02E 60/50* (2013.01)

(58) Field of Classification Search
CPC .............. C03C 8/14; C03C 8/18; C03C 8/24; C03C 8/02
USPC .................................... 501/14, 15, 17, 19, 21
See application file for complete search history.

(56) References Cited

U.S. PATENT DOCUMENTS

| | | | | |
|---|---|---|---|---|
| 2,711,975 | A * | 6/1955 | Wainer et al. ................. | 428/334 |
| 2,851,376 | A * | 9/1958 | Adlassnig ..................... | 427/214 |
| 3,170,812 | A * | 2/1965 | Schwartz ....................... | 427/543 |
| 4,057,777 | A * | 11/1977 | Merz et al. .................... | 338/309 |
| 4,959,256 | A * | 9/1990 | Piera ............................. | 428/144 |

(Continued)

FOREIGN PATENT DOCUMENTS

| | | |
|---|---|---|
| EP | 1616657 A1 | 1/2006 |
| EP | 1768204 A2 | 3/2007 |
| GB | 1230975 | 5/1971 |

OTHER PUBLICATIONS

Autonomic healing of polymer composites.
(Continued)

*Primary Examiner* — Noah Wiese
(74) *Attorney, Agent, or Firm* — Sofer & Haroun, LLP

(57) ABSTRACT

The present invention relates to a self-healing vitreous composition containing a particulate vandium additive, to a method for preparing same, and to the use thereof as a self-healing material, in particular for making seals in devices operating at a high temperature such as fuel oils and steam electrolyzers.

7 Claims, 3 Drawing Sheets

(56) References Cited

U.S. PATENT DOCUMENTS

| | | | |
|---|---|---|---|
| 4,985,377 A * | 1/1991 | Iseki et al. | 501/51 |
| 5,965,266 A | 10/1999 | Goujard et al. | |
| 6,245,699 B1 * | 6/2001 | Hudecek et al. | 501/18 |
| 7,138,347 B2 * | 11/2006 | Konno | 501/19 |
| 2007/0065707 A1 | 3/2007 | Zerfass et al. | |

OTHER PUBLICATIONS

Predicting Young's modulus of glass/ceramic sealant for solid oxide fuel cell considering the combined effects of aging, micro-voids and self-heating.

International Search Report dated Sep. 3, 2010.

* cited by examiner 2.a.

2.b.

SELF-HEALING VITREOUS COMPOSITION, METHOD FOR PREPARING SAME, AND USES THEREOF

RELATED APPLICATIONS

This application is a National Phase application of PCT/FR2010/051012, filed on May 27, 2010, which in turn claims the benefit of priority from French Patent Application No. 09 53490 filed on May 27, 2009, the entirety of which are incorporated herein by reference.

BACKGROUND

1. Field of the Invention

The present invention relates to a vitreous composition containing a vanadium-based particulate additive, to its method of preparation and to its use as self-healing material, in particular for manufacturing seals in devices operating at high temperature, such as fuel cells and steam electrolyzers.

2. Description of Related Art

Glasses and glass-ceramics are rigid materials widely used in industry, especially for producing seals in various devices that have to operate at high temperature, especially between 500 and 900° C. Among such devices, mention for example may be made of fuel cells (in particular solid electrolyte fuel cells or solid oxide fuel cells (SOFCs)) that operate at temperatures of 700 to 900° C. and steam electrolyzers that can be used for the production of hydrogen and also operate at very high temperature. In these two particular cases, the anode and cathode compartments must be separated and gastight because of the presence of hydrogen and oxygen. During the operation and use of these devices, the glasses and glass-ceramics present therein are subjected to thermal cycles that cause cracks to form. The appearance of these cracks therefore reduces the longevity of the devices incorporating such materials.

Two methods for healing cracks formed in glasses and glass-ceramics have already been proposed.

The first type of method, called "intrinsic self-healing", consists, without the addition of any healing additive, in filling the cracks or in repairing the surface state of a material of the glass, glass-ceramic or metal/glass composite type by a simple heat treatment in order to physically modify the material, usually to soften it. This treatment is carried out by heating the material or the device containing it to a temperature above the melting or softening point of the material. However, the temperatures used for such melting or softening are usually above the temperatures that the devices incorporating these materials can withstand. Thus, Liu et al. (Journal of Power Sources, 2008, 185, 1193-1200) discuss the heat treatment of SOFC fuel cells that contain glass seals based on a mixture of BaO, $SiO_2Al_2O_3$, CaO and $B_2O_3$, at a temperature above the creep temperature of the glass in order to repair the cracks formed, while indicating, however, that one limitation of this method is that the need to raise the temperature in order to make the glass creep causes prejudicial deformations of the system into which it is incorporated.

The second type of method, called "extrinsic self-healing", consists in adding a healing additive to the composition of the material which enables the cracks to be filled by a chemical reaction of said additive. This second method applies to materials of the polymer and ceramic/composite type. Thus, U.S. Pat. No. 5,965,266 describes the production of a fibrous material reinforced by a ceramic matrix that comprises a self-healing phase containing at least one glass precursor, for example carbon tetraboride ($B_4C$) or an SiBC system, and free carbon (10 to 35%). An oxidizing atmosphere, at a temperature of at least 450° C. but not exceeding 850° C., causes the carbon to oxidize, thereby subsequently transforming the self-healing phase into a glass so as to fill the cracks possibly present in the material. The above document therefore teaches that a composite material containing a glass precursor having the ability to be oxidized at a temperature of 850° C. or below, such as a precursor based on boron and/or silicon, is self-healing in an oxidizing atmosphere when the precursor composition used during its formation contains 15 to 35% carbon. Moreover, White et al. (Nature, 2001, 409, 794-797) describe a self-healing polymer material (polydicyclopentadiene) comprising a microencapsulated polymerizable self-healing agent (dicyclopentadiene) which is released upon appearance of a crack. The presence of a polymerization catalyst (Grubbs catalyst) in the structure of the polymer material is necessary in order to cause the healing agent to polymerize, at room temperature, and to fill the cracks. The material obtained after healing is, however, less resistant than in the initial state. Moreover, this healing technique must be carried out at room temperature and provides healing at any point in the material only if the polymerizable self-healing agent and the catalyst are in immediate proximity of each other and both uniformly distributed in the structure of the material.

OBJECTS AND SUMMARY

At the present time, there is therefore no glass or glass-ceramic composition having the property of rapidly self-healing at the operating temperatures of the devices in which said composition is intended to be used, in particular at use temperatures ranging from 400 to 900° C. Extrinsic self-healing is preferable in order to avoid having to raise the temperature above the operating temperature of the devices.

The object of the present invention is to provide a glass or glass-ceramic composition having such a property.

One subject of the present invention is a self-healing vitreous composition comprising at least one network-forming oxide and optionally one or more modifying oxides. This composition is characterized in that it further contains, in the form of solid particles, at least one healing additive chosen from vanadium and vanadium alloys.

The presence of vanadium and/or a vanadium alloy gives this composition the property of being self-healing at temperatures of around 400 to 500° C., i.e. temperatures below those normally employed for nonpolymer materials according to the intrinsic and extrinsic healing methods described in the prior art. This property is very advantageous in so far as it enables the longevity of the vitreous composition and the devices incorporating it to be increased, as it is unnecessary to reach temperatures above the creep temperature of the vitreous composition in order to observe heating. The temperatures at which this vitreous composition self-heals are also compatible with the normal operating temperatures of the devices in which it can be used, thereby preventing these devices from being degraded during the healing process. Thus, the healing additive may be chosen depending on the temperature at which it is desired to obtain the healing effect. Finally, and as will be demonstrated in the examples illustrating the present application, the vitreous composition according to the invention, i.e. containing particles of vanadium and/or a vanadium alloy as self-heating additive, heals more rapidly than vitreous compositions not according to the invention since they contain a vanadium-free healing additive such as, for example, $B_4C$.

The inventors have demonstrated that when cracks form in the vitreous composition of the invention, and when this composition is in contact with gaseous oxygen, the healing additive rapidly reacts with the oxygen to form vanadium oxide and possibly other oxides such as, for example, boron trioxide when the vitreous composition contains vanadium in the form of an alloy with another element such as, for example, boron (vanadium boride). The vanadium oxide and the other oxides possibly formed then enable the crack to be filled, these being perfectly compatible with the principal components (network-forming and modifying oxides) of the glassy matrix.

In the context of the present invention, the term "vitreous composition" is understood to mean oxide glasses consisting of a vitreous (amorphous) phase and glass-ceramics consisting of a vitreous phase (of the same type as the vitreous phase of oxide glasses) and a crystalline phase present in the form of crystals dispersed within the vitreous phase. Glass-ceramics result from the controlled devitrification of a chemically homogeneous glass via heat treatment at a temperature appropriate for the formation of crystallization nuclei. This heat treatment is called ceramization.

Also in the context of the present invention, the term "network-forming oxides" is understood to mean oxides of elements that can form, by themselves, the skeleton (glassy matrix) of the vitreous composition. The network-forming elements most commonly used are silicon Si (in its oxide form $SiO_2$) which is the predominant constituent of glassy matrices, boron B (in its oxide form $B_2O_3$), phosphorus P (in its oxide form $P_2O_5$) and germanium Ge (in its oxide form $GeO_2$).

Again in the context of the present invention, the term "modifying oxides" (or non-network forming oxides) is understood to means oxides of elements that cannot form a glassy matrix by themselves. These are essentially alkali metal oxides, alkaline-earth metal oxides and, to a lesser extent, certain oxides of transition or rare-earth elements. The alkali metal oxides, also called "fluxes", are used to lower the melting point of the glassy matrix. They comprise especially sodium oxide ($Na_2O$), potassium oxide ($K_2O$), and lithium oxide ($Li_2O$). Other oxides, also called "stabilizers", are used to modify the physical and/or mechanical properties of the glassy matrix generally attenuated by the addition of the fluxes. They comprise alkaline-earth oxides such as calcium oxide (CaO) which increases the chemical resistance of the glass, zinc oxide (ZnO) which increases the brilliance and elasticity of the glass, iron oxide ($Fe_2O_3$) which is both a stabilizer and a pigment, and lead oxide (PbO) which forms part of the composition of the crystal and also lowers the melting point by stabilizing the vitreous composition.

According to a preferred embodiment of the invention, the network-forming oxides and the modifying oxides are chosen from oxides of elements chosen from silicon, boron, phosphorus, aluminum, alkali metals, alkaline-earth metals, iron and zinc.

According to the invention, the vanadium alloys are preferably chosen from alloys composed of vanadium and at least one additional element chosen from the metallic elements of atomic number 22 to 31, 39 to 42, 44, 47 to 51, 82 and 83 and the non-metallic elements of atomic number 5 to 7, 13 to 15, 33 and 52.

According to a preferred embodiment of the invention, the healing additive is chosen from vanadium (V), and vanadium alloys chosen from vanadium boride (VB), vanadium diboride ($VB_2$), vanadium tetraboride ($VB_4$), vanadium carbide (VC), vanadium silicide ($VSi_2$), vanadium sulfide, vanadium phosphide (VP) and mixtures thereof. According to one particularly preferred embodiment of the invention, the healing additive is chosen from vanadium, vanadium boride, vanadium carbide and mixtures thereof.

It is possible to modulate the healing temperature depending on the choice of healing additive. Thus, vanadium (V) oxidizes at 350° C. and upward, VB at 400° C. and upward and VC at 350° C. and upward.

The solid particles of the healing additive that can be used in the vitreous composition of the invention preferably have a mean size of about 1 to 60 µm and preferably about 1 to 10 µm.

Within the vitreous composition according to the present invention, the healing additive preferably represents about 5 to 20% by volume, and even more preferably about 5 to 10% by volume, relative to the total volume of the composition.

Although the healing effect is proportional to the volume content of healing additive, the amount of said additive may also be expressed as a percentage by weight. In this case, within the vitreous composition according to the present invention, the healing additive preferably represents about 1 to 4% by weight, and even more preferably about 1 to 2% by weight, relative to the total weight of the composition.

In addition to the vanadium-based healing additive, the composition according to the present invention may further contain one or more additional healing additives normally used in self-healing compositions and among these the following may be mentioned, by way of example: boron (B), boron tetraboride ($B_4C$) boron nitride (BN), silicon nitride ($Si_3N_4$) and silicon carbide (SiC).

When said additional healing additives are used, they preferably represent about 1 to 4% by weight relative to the total weight of the vitreous composition.

When the self-healing vitreous composition according to the invention is a glass-ceramic composition, it may furthermore contain at least one nucleation promoter, enabling better (more homogeneous) distribution of the crystals to be obtained. This is usually a fluoride such as for example calcium fluoride ($CaF_2$) or a phosphate, such as for example lithium phosphate ($Li_3PO_4$).

The vitreous composition according to the invention may be prepared by a method which is simple, rapid and inexpensive to implement.

Another subject of the invention is therefore a method of preparing a self-healing vitreous composition (SVC) according to the invention and as defined above, characterized in that it comprises at least the following steps:
  a first step of preparing a putverulent vitreous composition (PVC) consisting of solid particles, by milling a non-pulverulent vitreous composition (NPVC) comprising at least one network-forming oxide and optionally one or more modifying oxides;
  a second step of preparing a self-healing pulverulent vitreous composition (SPVC) by blending the pulverulent vitreous composition (PVC) resulting from the first step with solid particles of at least one healing additive chosen from vanadium and vanadium alloys; and
  a third step of densifying the self-healing pulverulent vitreous composition (SPVC) resulting from the second step, by heat treatment in an inert atmosphere.

According to the invention, the expression "nonpulverulent vitreous composition" is understood to mean any glass composition prepared by the melting methods conventionally used to produce glass.

During the first step, the milling of the NPVC is carried out until solid particles preferably having a mean size of 1 to 60 µm, and even more preferably 1 to 10 µm, are obtained. This milling may be carried out by any conventional milling technique known to those skilled in the art.

According to the invention, during the second step, the vanadium alloys are preferably chosen from alloys composed of vanadium and at least one additional element chosen from the metallic elements of atomic number 22 to 31, 39 to 42, 44, 47 to 51, 82 and 83 and the non-metallic elements of atomic number 5 to 7, 13 to 15, 33 and 52.

During the second step, in addition to the vanadium-based healing additive, one or more conventional additional healing additives normally used in self-healing compositions may also be added to the PVC, among which additives the following may be mentioned by way of example: boron (B), boron tetraboride ($B_4C$), boron nitride (BN), silicon nitride ($Si_3N_4$) and silicon carbide (SiC).

The blending of the PVC with the solid particles of the healing additive (vanadium-based additive and optionally additional healing additive) during the second step is preferably carried out by the method of progressive additions or using a mechanical blender, these two blending techniques making it possible in fact to obtain a homogeneous distribution of the healing additive particles in the PVC.

It is important to carry out the densification third step in an inert (for example argon or nitrogen) atmosphere so as to avoid any premature oxidation of the healing additive so that this can then react with gaseous oxygen upon appearance of a crack in the self-heating vitreous composition of the invention. After densification, the self-healing vitreous composition of the invention can therefore be used in an oxidizing atmosphere without any restriction.

According to one particular and preferred embodiment of the method in accordance with the invention, the densification heat treatment carried out during the third step comprises at least:
  i) a first substep in which the temperature is rapidly raised, for example at a rate of about 30° C./min, up to the densification temperature of the SPVC, said densification temperature being determined from the dilatometric softening temperature of the NPVC used during the first step, or by means of a heating microscope;
  ii) a second substep in which the densification temperature is maintained for a time of about 1 to 2 hours; and
  iii) a third substep of cooling down to room temperature, for example at a rate of about 10 to 20° C./min.

According to a first variant of the method in accordance with the invention, the self-healing vitreous composition is intended to be used as a seal in a device operating at high temperature (i.e. at a temperature of 400 to 900° C.). In this case, the method in accordance with the invention further includes, before the densification third step, an additional step of producing the seals by means of the SPVC within said device. To do this, the SPVC is used as a conventional glass frit and then the device in which the seals have been produced undergoes the densification heat treatment defined above in the third step. In this case, the SPVC preferably contains at least one additive chosen from slips, binders and sintering aids. The heat treatment of the SPVC is preferably carried out according to a method comprising, apart from substeps i) to iii) detailed above, an additional substep prior to substep i), during which the SPVC is slowly heated, for example at a rate of about 1° C./min, up to a temperature of about 450° C. This preliminary slow heating substep is used to remove the binder from the SPVC.

According to a second variant of the method, the self-healing vitreous composition is intended to be produced by itself (not in any device), for example for manufacturing bulk self-healing materials. In this case, the method of preparation according to the invention further includes, before the densification third step is carried out, a step of forming the SPVC, for example by uniaxial pressing.

When the SVC is a glass-ceramic, the method according to the invention then further includes, after the densification third step, a fourth step of ceramization by heat treatment. The temperature and duration of this fourth step may be determined by the methods conventionally used in the field, generally by means of a prior characterization by differential thermal analysis (DTA).

The final subject of the invention is the various uses of the self-healing vitreous composition according to the invention and as defined above.

A particular subject is the use of a self-healing vitreous composition as defined above as self-healing material, especially for the manufacture of seals in devices operating at a temperature of 400° C. to 900° C., such as solid electrolyte fuel cells and steam electrolyzers.

Another subject of the invention is the use of a self-healing vitreous composition as defined above for the manufacture of a glass or glass-ceramic coating of the enamel type, and especially for the manufacture of a coating for corrosion protection at high temperature (i.e. at a temperature of 400 to 900° C.).

The present invention is illustrated by the following embodiment example, to which said invention is not limited.

DETAILED DESCRIPTION

Example

Preparation of A Self-Healing Glass-Ceramic

1) Preparation of Glass-Ceramic Compositions Containing Vanadium Boride as Healing Additive In this example, a self-healing glass-ceramic was prepared from a glass composition (glass 1) derived from a sealing glass-ceramic precursor glass composition from the reference: Lara et al., "Sintering of glasses in the system RO—$Al_2O_3$—BaO—$SiO_2$ (R=Ca, Mg, Zn) studied by hot-stage microscopy", Solid State Ionics, 2004, 170, 201-208.

Glass 1 had the following composition, expressed in molar percentages:
  CaO: 14-15;
  BaO: 28-29;
  $Al_2O_3$: 9-10;
  $SiO_2$: 47-48.

In the glass 1 composition, the mean size of the particles was about 50 μm.

The glass 1 composition was then blended with vanadium boride particles having a mean size of 50 µm, in an amount of 10% by volume, using the method of progressive additions.

The resulting blend (blend 1) was then formed, by uniaxial pressing at a pressure of 1000 kg/cm², in a stainless steel cylindrical die (diameter: 1.2 cm).

A cylinder of compressed blend 1 having the following dimensions was obtained: length: 0.7 cm; diameter: 1.2 cm. This cylinder was then densified at a temperature of 1000° C., in argon, for one hour in an electric furnace. The density of the glass-ceramic thus obtained (GC 10) was close to 100% of the theoretical density (about 3.75 g/cm³). This heat treatment also allowed the glass-ceramization of the material in accordance with the method explained in Lara et al, (see above).

The glass-ceramics GC 5, GC 15 and GC 20, containing respectively 5%, 15% and 20% by volume of vanadium boride per 100 volumes of glass 1 composition, were thus prepared under the same conditions.

For comparison, a glass-ceramic containing no vanadium boride (GC 0) was prepared from the glass 1 composition under the same conditions as those used above to prepare GC 10.

2) Illustration of the Self-Healing Properties of the Glass-Ceramics According To the Invention The thermal expansion properties of all these glass-ceramics were then studied by thermomechanical analysis using a thermomechanical analyzer sold under the name TMA SETSYS by the company SETARAM. The curves were recorded at a speed of 10° C./min, between 200° C. and 1000° C.

Figure 1:
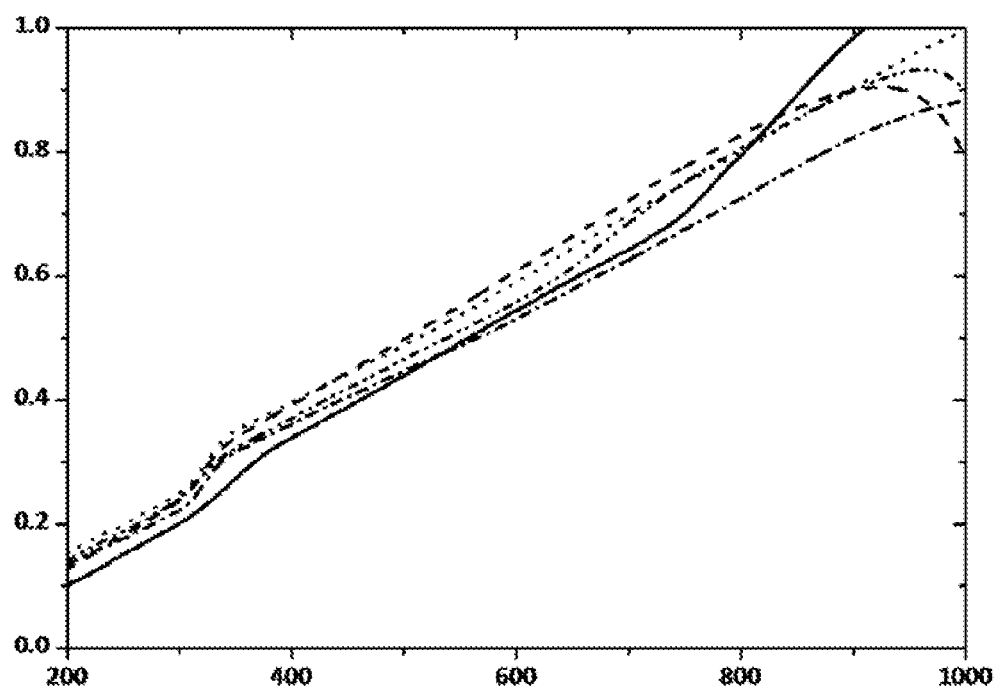
FIG. 1 shows a thermomechanical analysis of the Example recorded at a speed of 10° C./min, between 200° C. and 1000° C. in which the expansion (in %) is plotted as a function of temperature (in ° C.)

The curves obtained are shown in appended FIG. 1 in which the expansion (in %) is plotted as a function of temperature (in ° C.). In this figure, the curve plotted as a continuous line corresponds to GC 0; the dashed curve corresponds to GC 5, the dotted curve corresponds to GC 10; the dot-dash curve corresponds to GC 15 and the double dot-dash curve corresponds to CC 20.

These curves demonstrate that the thermal expansion properties of the glass-ceramics according to the present invention (GC 5, GC 10, GC 15 and GC 20) are not affected by the presence of the vanadium boride particles as healing additive.

The cylinder of GC 10 was fractured, this fracture had the following dimensions: total length: 1.2 cm; total depth: 0.7 cm; average width: 0.01 cm. The fractured cylinder then underwent a heat treatment for 1 h at 700° C. in static air to simulate the conditions of use. This temperature is below the glass transition temperature ($T_g$) of the glass ($T_g$=760° C.) so as to be under conditions where intrinsic self-healing, that is to say by softening, cannot occur.

Figure 2:
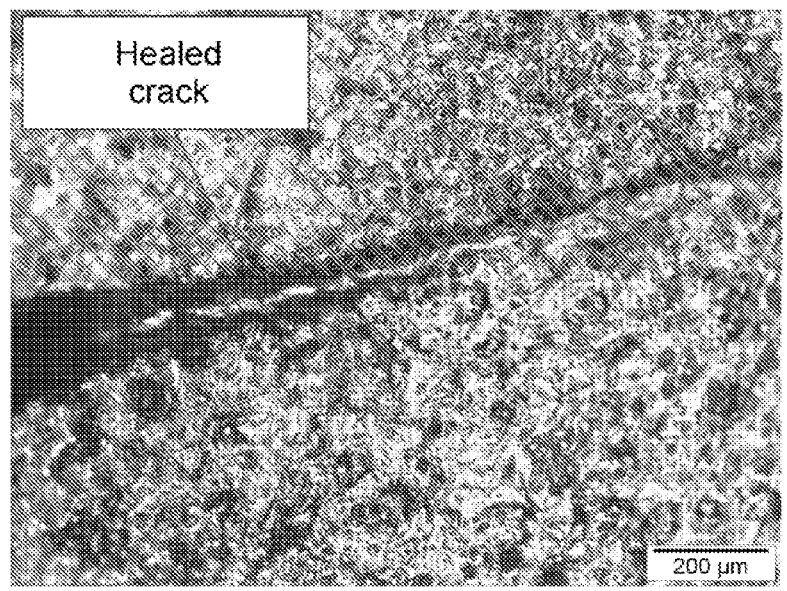
FIG. 2a is an optical micrograph (×10 magnification) of the glass-ceramic after the heat treatment of the Example.
FIG. 2b is a micrograph of the Example taken by environmental electron microscopy (×20 000 magnification) of the glass-ceramic before the heat treatment (0 min.), after 20 minutes of heat treatment (20 min.) and after 60 minutes of heat treatment (60 min.)
Figure 2:
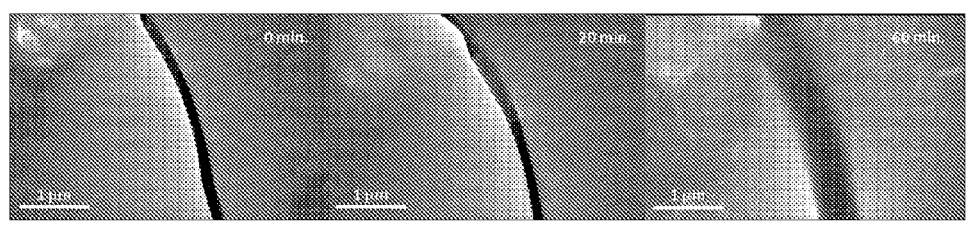

The appended FIG. 2.a is an optical micrograph (×10 magnification) of the glass-ceramic after the heat treatment. The appended FIG. 2.b is a micrograph taken by environmental electron microscopy (×20 000 magnification) of the glass-ceramic before the heat treatment (0 min.), after 20 minutes of heat treatment (20 min.) and after 60 minutes of heat treatment (60 min.).

It may be seen in FIGS. 2.a and 2.b that the oxidation of VB at 700° C. is rapid and leads to self-healing of the crack. Specifically, FIGS. 2.a and 2.b show that the crack is filled with one or more phases resulting from the oxidation of VB.

Figure 3:
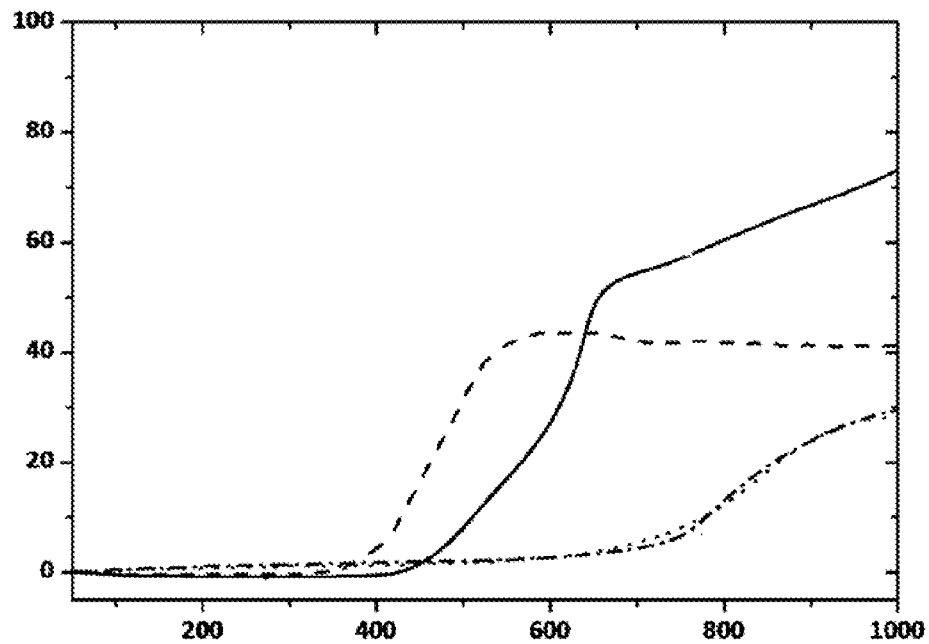
FIG. 3 shows the oxidation curves of the Example obtained by thermogravimetric analysis (TGA) of these various particles containing or not containing vanadium as a function of temperature.

To test the reactivity of the particles of vanadium-based healing additive according to the present invention, the oxidation temperatures of vanadium boride (VB) and vanadium carbide (VC) particles alone were compared, by thermogravimetric analysis in a stream of air (20 cm³/min), using a thermogravimetric analyzer sold under the name TGA SETSYS by the company SETARAM, with those of carbon tetraboride ($B_4C$) and boron (B) particles alone. The appended FIG. 3 shows the oxidation curves obtained by thermogravimetric analysis (TGA) of these various particles containing or not containing vanadium as a function of temperature. In this figure, the gain in mass of the particles due to oxidation (in %) is plotted as a function of the temperature (in ° C.). The curve plotted as a continuous line corresponds to VB, the dashed curve corresponds to VC, the dotted curve corresponds to B and the dot-dash curve corresponds to $B_4C$.

It may be seen that the vanadium-based particles that can be used as healing additive according to the invention (VB and VC) start to oxidize at 350° C. in the case of VC and 400° C. in the case of VB, i.e. at temperatures well below the temperatures needed to cause the $B_4C$ and B particles to oxidize (above 800° C.: temperatures above the softening or creep temperature of the material into which they are incorporated).

The rate of oxidation of these various particles (VB, VC, $B_4C$ and B) was also compared by gravimetric analysis as a function of time. The results obtained are given in the appended FIG. 4, in which the ratio $\Delta m/m$, corresponding to (the difference ($\Delta m$) between the mass of an oxidized particle and the mass of an unoxidized particle)/(mass (m) of an unoxidized particle), is plotted as a function of time in minutes. In this figure, the curve plotted as a broken line corresponds to VC, the curve plotted as a continuous line corresponds to VB, the dot-dash curve corresponds to $B_4C$ and the dotted curve corresponds to B.

Figure 4:
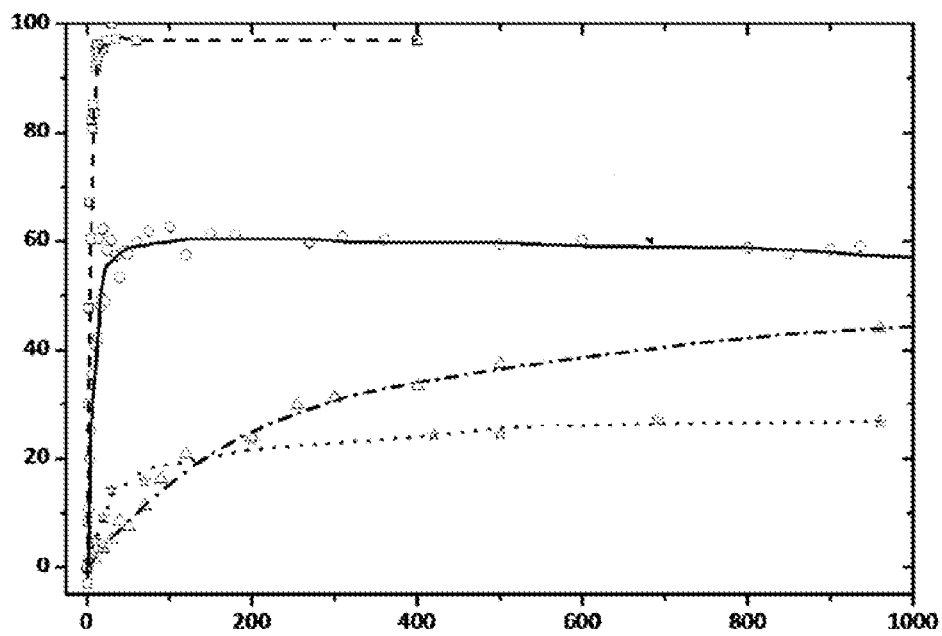
FIG. 4 shows the rate of oxidation of these various particles (VB, VC, $B_4C$ and B) of the Example compared by gravimetric analysis as a function of time.

From the curves in this FIG. 4 it may be seen that the VB and VC particles oxidize very rapidly (in a few minutes), whereas the $B_4C$ and B particles oxidize significantly more slowly.

All of the results presented in this example show that the presence of the particles of vanadium-based healing additive in a glass or glass-ceramic composition according to the invention do not in any way impair its thermal expansion properties, and make it possible to induce rapid self-healing of the glass or glass-ceramic at a temperature below the melting point of the material (from 350° C. upwards), something which would not be the case with particles containing no vanadium, such as $B_4C$ and B particles.

The invention claimed is:

1. A method of preparing a self-healing vitreous composition having at least one network-forming oxide, optionally one or more modifying oxides, and at least one healing additive chosen from vanadium and vanadium alloys in the form of solid particles, wherein said method comprises at least the following steps:
    a first step of preparing a pulverulent vitreous composition consisting of solid particles, by milling a non-pulverulent vitreous composition comprising at least one network-forming oxide and optionally one or more modifying oxides;
    a second step of preparing a self-healing pulverulent vitreous composition by blending the pulverulent vitreous composition resulting from the first step with solid particles of at least one healing additive chosen from vanadium and vanadium alloys; and
    a third step of densifying the self-healing pulverulent vitreous composition resulting from the second step, by heat treatment in an inert atmosphere, said third step including at least
    i) a first substep in which the temperature is rapidly raised at a rate of 30° C./min, up to the densification temperature of the self-healing pulverulent vitreous composition, said densification temperature being determined from the dilatometric softening temperature of the non-pulverulent vitreous composition used during the first step, or by means of a heating microscope:

ii) a second substep in which the densification temperature is maintained for a time of 1 to 2 hours; and iii) a third substep of cooling down to room temperature at a rate of 10 to 20° C./min.

2. The method as claimed in claim 1, wherein the blending of the pulverulent vitreous composition with the solid particles of the healing additive during the second step is carried out by the method of progressive additions or using a mechanical blender.

3. The method as claimed in claim 1, wherein the self-healing vitreous composition is used as a seal in a device operating at high temperature and in that said method further includes, before the densification third step, an additional step of producing the seals by means of the self-healing pulverulent vitreous composition within said device and then the device in which the seals have been produced undergoes said densification heat treatment.

4. The method as claimed in claim 3, wherein the self-healing pulverulent vitreous composition contains at least one additive selected from the group consisting of slips, binders and sintering aids.

5. The method as claimed in claim 3, wherein the heat treatment of the self-healing pulverulent vitreous composition is carried out according to a method comprising, apart from substeps i) to iii) defined above, an additional substep prior to substep i), during which the self-heating pulverulent vitreous composition is slowly heated, at a rate of 1° C./min, up to a temperature of 450° C.

6. The method as claimed in claim 1, wherein the self-healing vitreous composition is intended to be used for manufacturing bulk self-healing materials and in that said method further includes, before the densification third step is carried out, a step of forming the self-healing pulverulent vitreous composition.

7. The method as claimed in claim 1, wherein the self-healing vitreous composition is a glass-ceramic forming composition, and, in that said method further includes, after the densification third step, a fourth step of ceramization of said self-healing vitreous composition is a glass-ceramic forming composition by heat treatment.

* * * * *